(12) United States Patent
Zhao et al.

(10) Patent No.: US 12,183,062 B2
(45) Date of Patent: Dec. 31, 2024

(54) SYSTEM AND METHOD FOR SUPERVISED CONTRASTIVE LEARNING FOR MULTI-MODAL TASKS

(71) Applicant: Samsung Electronics Co., Ltd., Suwon-si (KR)

(72) Inventors: Changsheng Zhao, Santa Clara, CA (US); Burak Uzkent, Mountian View, CA (US); Yilin Shen, Santa Clara, CA (US); Hongxia Jin, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 383 days.

(21) Appl. No.: 17/589,535

(22) Filed: Jan. 31, 2022

(65) Prior Publication Data
US 2023/0245435 A1 Aug. 3, 2023

(51) Int. Cl.
*G06V 10/80* (2022.01)
*G06F 40/279* (2020.01)
*G06V 10/774* (2022.01)
*G06V 10/778* (2022.01)

(52) U.S. Cl.
CPC .......... *G06V 10/811* (2022.01); *G06F 40/279* (2020.01); *G06V 10/774* (2022.01); *G06V 10/778* (2022.01)

(58) Field of Classification Search
CPC .. G06V 10/811; G06V 10/778; G06V 10/774; G06F 40/279
See application file for complete search history.

(56) References Cited

U.S. PATENT DOCUMENTS

| | | | |
|---|---|---|---|
| 10,775,022 B2 | 9/2020 | Di Trapani et al. | |
| 2020/0117951 A1 | 4/2020 | Li et al. | |
| 2020/0327409 A1 | 10/2020 | Kim et al. | |
| 2020/0380358 A1* | 12/2020 | Kemertas | G06F 16/23 |
| 2020/0410989 A1* | 12/2020 | Ray | G06F 40/216 |
| 2021/0027020 A1* | 1/2021 | Shen | G06F 40/30 |
| 2022/0391755 A1* | 12/2022 | Li | G06N 3/045 |

FOREIGN PATENT DOCUMENTS

| | | |
|---|---|---|
| CN | 109992686 A | 7/2019 |
| CN | 113095415 A | 7/2021 |

\* cited by examiner

*Primary Examiner* — Pinalben Patel (57) ABSTRACT

A method includes obtaining a batch of training data including multiple paired image-text pairs and multiple unpaired image-text pairs, where each paired image-text pair and each unpaired image-text pair includes an image and a text. The method also includes training a machine learning model using the training data based on an optimization of a combination of losses. The losses include, for each paired image-text pair, (i) a first multi-modal representation loss based on the paired image-text pair and (ii) a second multi-modal representation loss based on two or more unpaired image-text pairs, selected from among the multiple unpaired image-text pairs, wherein each of the two or more unpaired image-text pairs includes either the image or the text of the paired image-text pair.

20 Claims, 8 Drawing Sheets

SYSTEM AND METHOD FOR SUPERVISED CONTRASTIVE LEARNING FOR MULTI-MODAL TASKS

TECHNICAL FIELD

This disclosure relates generally to machine learning systems. More specifically, this disclosure relates to a system and method for supervised contrastive learning for multi-modal tasks.

BACKGROUND

Contrastive learning may be used in self-supervised learning applications with visual data. For large-scale datasets having image-text pairs, contrastive learning may be used for pre-training to improve transfer learning on downstream tasks, which may improve performance in accuracy and robustness compared to other image-text matching methods when considering fine-tuning of downstream tasks, such as visual question answering (VQA), graph question answering (GQA), referring expressions, caption generation, and image retrieval. As mentioned above, these contrastive-learning approaches have focused on the pre-training stage with multi-modal datasets having image and text pairs to boost the performance of downstream tasks.

SUMMARY

This disclosure provides a system and method for supervised contrastive learning for multi-modal tasks.

In a first embodiment, a method includes obtaining a batch of training data including multiple paired image-text pairs and multiple unpaired image-text pairs, where each paired image-text pair and each unpaired image-text pair includes an image and a text. The method also includes training a machine learning model using the training data based on an optimization of a combination of losses. The losses include, for each paired image-text pair, (i) a first multi-modal representation loss based on the paired image-text pair and (ii) a second multi-modal representation loss based on two or more unpaired image-text pairs, selected from among the multiple unpaired image-text pairs, wherein each of the two or more unpaired image-text pairs includes either the image or the text of the paired image-text pair.

In a second embodiment, an electronic device includes at least one memory configured to store instructions. The electronic device also includes at least one processing device configured when executing the instructions to obtain a batch of training data including multiple paired image-text pairs and multiple unpaired image-text pairs, where each paired image-text pair and each unpaired image-text pair includes an image and a text. The at least one processing device is also configured when executing the instructions to train a machine learning model using the training data based on an optimization of a combination of losses. The losses include, for each paired image-text pair, (i) a first multi-modal representation loss based on the paired image-text pair and (ii) a second multi-modal representation loss based on two or more unpaired image-text pairs, selected from among the multiple unpaired image-text pairs, wherein each of the two or more unpaired image-text pairs includes either the image or the text of the paired image-text pair.

In a third embodiment, a non-transitory machine-readable medium contains instructions that when executed cause at least one processor of an electronic device to obtain a batch of training data including multiple paired image-text pairs and multiple unpaired image-text pairs, where each paired image-text pair and each unpaired image-text pair includes an image and a text. The medium also contains instructions that when executed cause the at least one processor to train a machine learning model using the training data based on an optimization of a combination of losses. The losses include, for each paired image-text pair, (i) a first multi-modal representation loss based on the paired image-text pair and (ii) a second multi-modal representation loss based on two or more unpaired image-text pairs, selected from among the multiple unpaired image-text pairs, wherein each of the two or more unpaired image-text pairs includes either the image or the text of the paired image-text pair.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another.

For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 5, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As discussed above, contrastive learning may be used in self-supervised learning applications with visual data. For large-scale datasets having image-text pairs, contrastive learning may be used for pre-training to improve transfer learning on downstream tasks, which may improve performance in accuracy and robustness compared to other image-text matching methods when considering fine-tuning of downstream tasks, such as visual question answering (VQA), graph question answering (GQA), referring expressions, caption generation, and image retrieval. As mentioned above, these contrastive-learning approaches have focused on the pre-training stage with multi-modal datasets having image and text pairs to boost the performance of downstream tasks. Contrastive learning has not been explored for fine-tuning of multi-modal downstream tasks, which can further boost performance.

This disclosure provides systems and methods for supervised contrastive learning for multi-modal downstream tasks to improve the performance of multi-modal tasks with image-text pairs. As described in more detail below, the disclosed systems and methods feature global cross-modality alignment between the image-text pairs in a mini-batch. Also, the disclosed systems and methods may feature another contrastive learning objective for region level features across different images. This can result in improved accuracy in various multi-modal tasks including an image and text pair, such as VQA, GQA, referring expressions, and image retrieval. For example, in VQA applications, the disclosed systems and methods can improve prediction of a correct answer. As another example, in image retrieval applications, the disclosed systems and methods can ensure more accurate selection of the correct image(s) to retrieve based on the input. As these examples illustrate, the systems and methods for supervised contrastive learning for multi-modal downstream tasks are generally applicable to text-image pairing tasks. Moreover, the systems and methods of this disclosure can be combined with objectives or learning losses that are specific to a particular task in order to further improve accuracy for that task. Note that while some of the embodiments discussed below are described in the context of use for consumer electronic devices, but this is merely one example. It will be understood that the principles of this disclosure may be implemented in any number of other suitable contexts.

Figure 1:
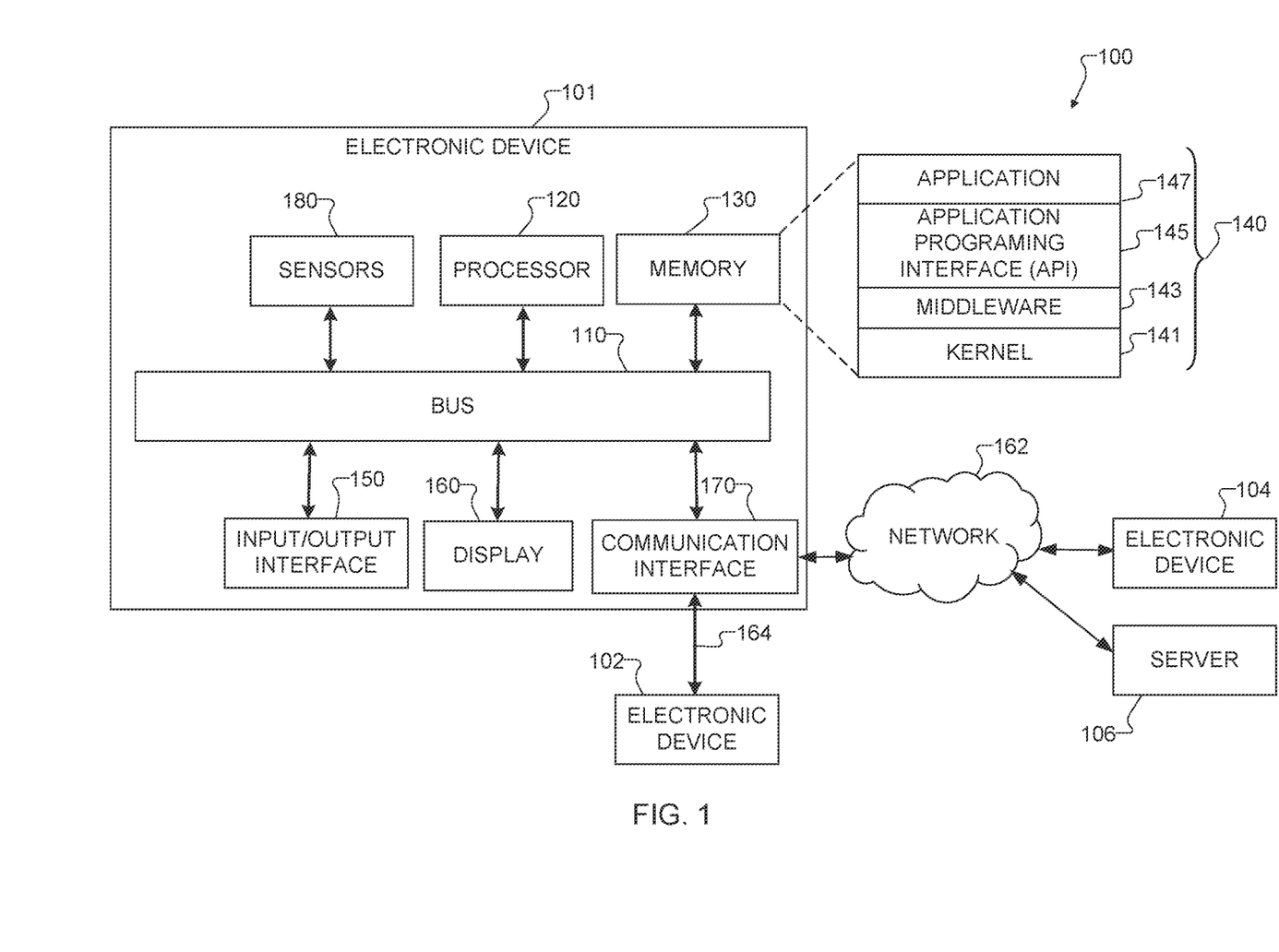
FIG. 1 illustrates an example network configuration including an electronic device according to this disclosure.

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). As described in more detail below, the processor 120 may perform one or more operations for supervised contrastive learning for multi-modal tasks.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support one or more functions for supervised contrastive learning for multi-modal tasks as discussed below. These functions can be performed by a single application or by multiple applications that each carry out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HND). When the electronic device 101 is mounted in the electronic device 102 (such as the HND), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform one or more operations to support techniques for supervised contrastive learning for multi-modal tasks.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
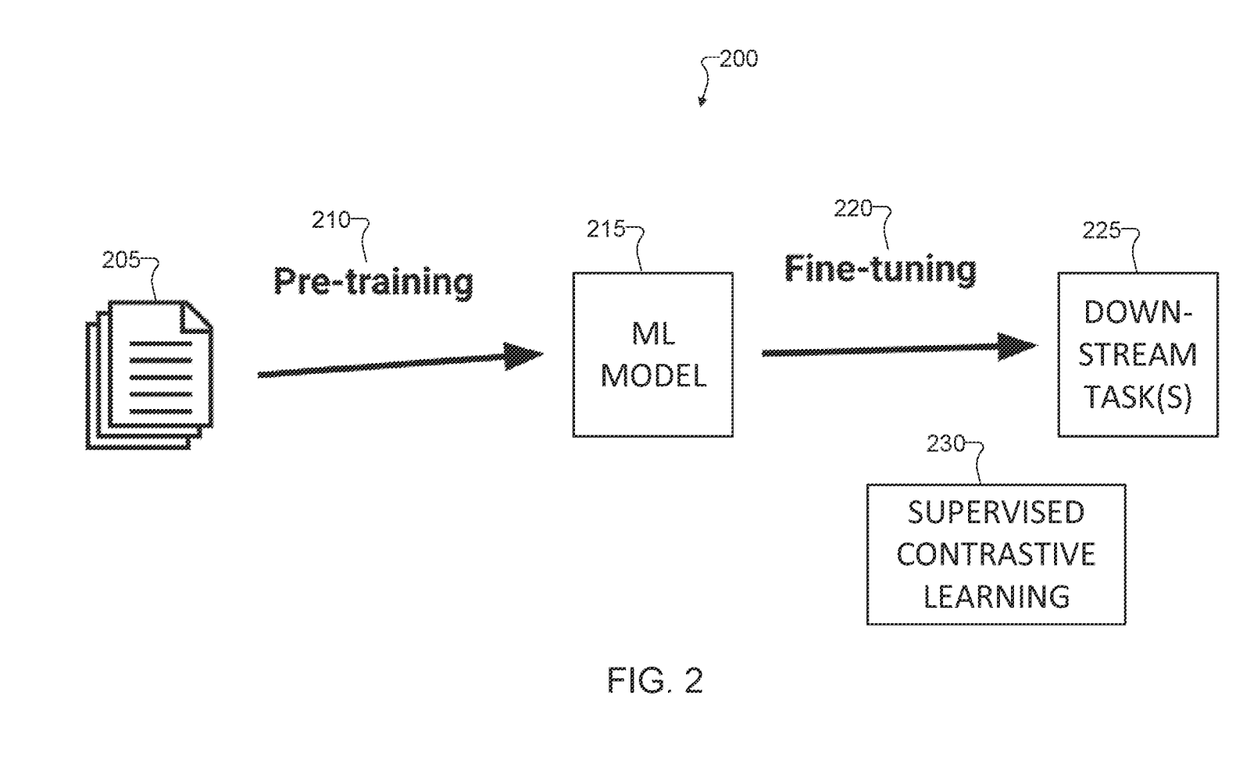
FIG. 2 illustrates an example framework in which supervised contrastive learning for multi-modal tasks can be implemented according to this disclosure.

FIG. 2 illustrates an example framework 200 in which supervised contrastive learning for multi-modal tasks can be implemented according to this disclosure. For ease of explanation, the framework 200 is described as being implemented using one or more components of the electronic device 101 described above. However, this is merely one example, and the framework 200 could be implemented using any other suitable device(s), such as when implemented using the server 106.

As shown in FIG. 2, using the framework 200, the electronic device 101 receives a batch of training data 205, which can include one or more images and one or more text strings (also referred to simply as texts). The electronic device 101 performs one or more pre-training tasks 210 using the training data 205 before the training data is input to a machine learning model 215. As discussed above, the one or more pre-training tasks 210 can be performed to improve transfer learning for one or more downstream tasks 225. In some embodiments, the one or more pre-training tasks 210 can include mask-language modeling (MLM) on unlabeled training data 205.

Following the one or more pre-training tasks 210, the electronic device 101 trains the machine learning model 215. The machine learning model 215 can include any suitable machine learning model or deep learning model, such as a convolutional neural network (CNN). As particular examples, the machine learning model 215 can include a word2vec, Global Vectors (GloVe), skip-thought, InferSent, Embeddings from Language Models (ELMo), Universal Language Model FIne-Tuning (ULMFIT), Generative Pre-trained Transformer (GPT), Bidirectional Encoder Representations from Transformers (BERT), or other suitable machine learning model. Of course, these are merely examples, and other suitable machine learning models are within the scope of this disclosure.

Once the machine learning model 215 is trained, the electronic device 101 can perform one or more fine-tuning tasks 220 to fine-tune the machine learning model 215 before or in conjunction with performing the one or more downstream tasks 225. The one or more downstream tasks 225 can include one or more multi-modal tasks using image-text pairs, such as VQA, GQA, referring expressions, image captioning, image retrieval, and the like. In accordance with this disclosure, the electronic device 101 can perform supervised contrastive learning 230 for multi-modal tasks as part of the one or more fine-tuning tasks 220, the one or more downstream tasks 225, or both. Additional details regarding the supervised contrastive learning process are provided below.

Although FIG. 2 illustrates one example of a framework 200 in which supervised contrastive learning for multi-modal tasks can be implemented, various changes may be made to FIG. 2. For example, while the framework 200 is described with various examples of machine learning models 215 and downstream tasks 225, other embodiments could include other machine learning models 215 and/or other downstream task 225. Also, while shown as a specific sequence of operations, various operations shown in FIG. 2 could overlap, occur in parallel, occur in a different order, or occur any number of times (including zero times). In addition, the specific operations shown in FIG. 2 are examples only, and other techniques could be used to perform each of the operations shown in FIG. 2.

Figure 3A:
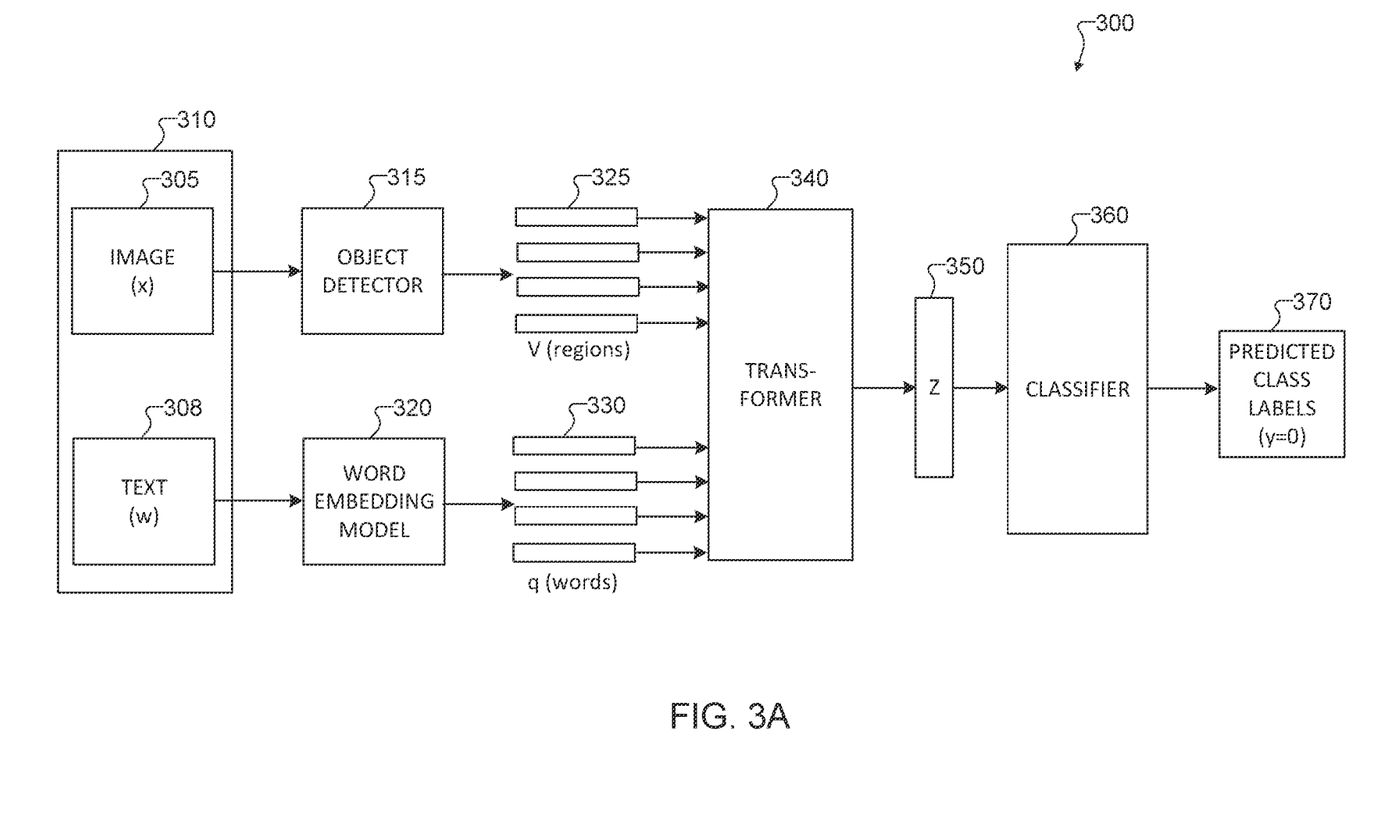
FIGS. 3A through 3C illustrate multiple iterations of an example process for supervised contrastive learning for multi-modal tasks according to this disclosure.
Figure 3B:
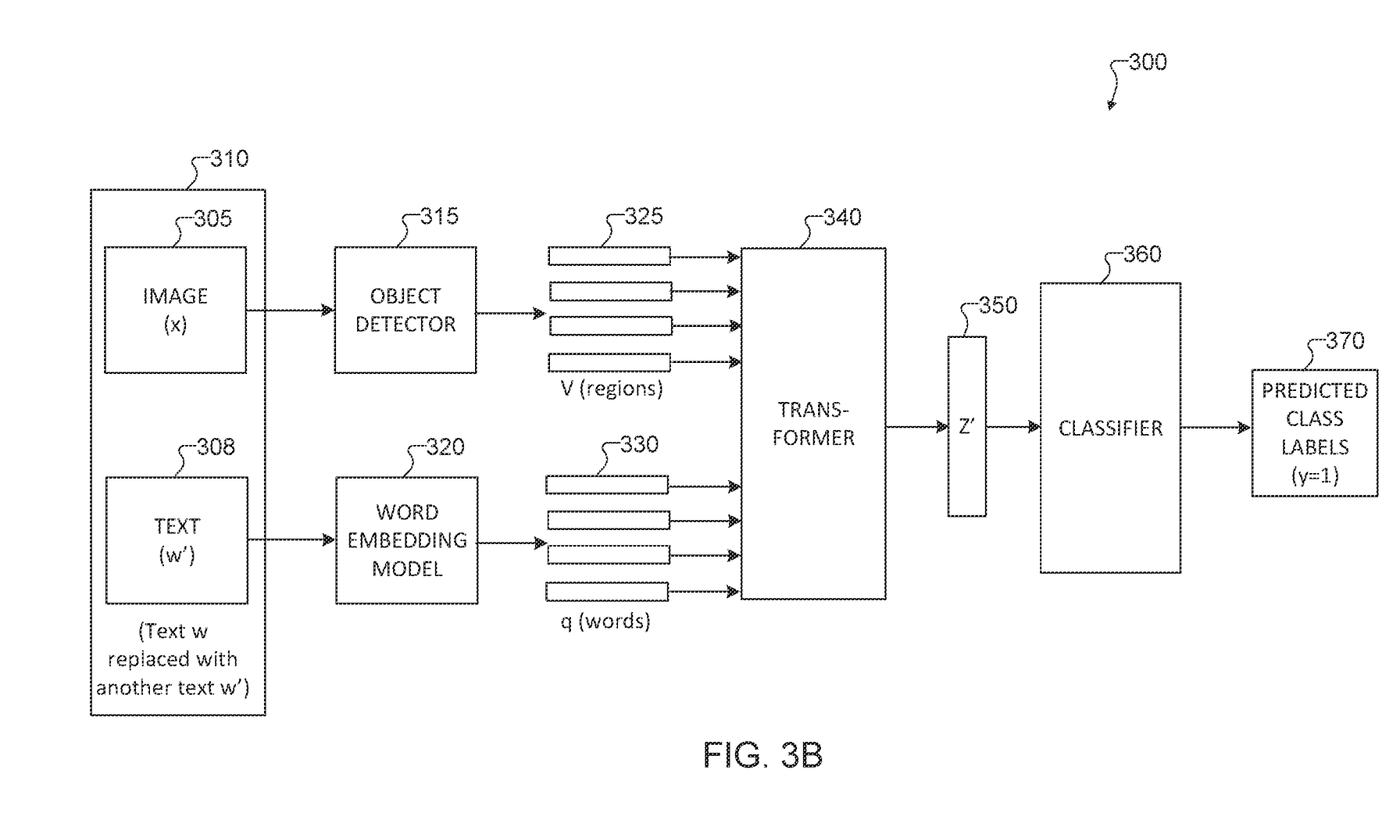
Figure 3C:
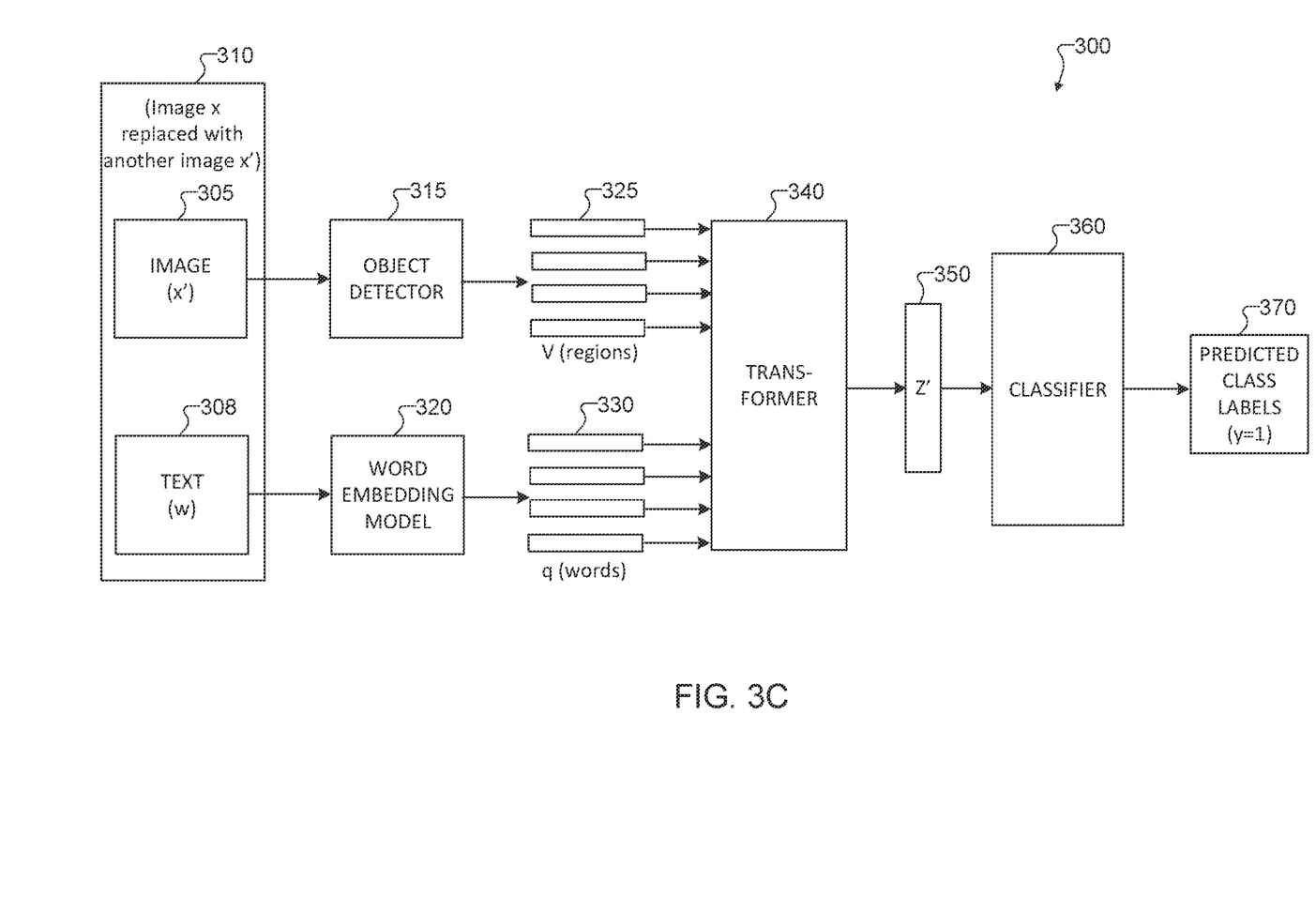

FIGS. 3A through 3C illustrate multiple iterations of an example process 300 for supervised contrastive learning for multi-modal tasks according to this disclosure. For ease of explanation, the process 300 is described as representing at least a portion of the supervised contrastive learning 230 of FIG. 2 and can be performed in conjunction with one or more fine-tuning tasks, such as the one or more fine-tuning tasks 220 of FIG. 2. Also, for ease of explanation, the process 300 is described as being performed using one or more components of the electronic device 101 described above. However, this is merely one example, and the process 300 could be performed using any other suitable device(s), such as the server 106.

As shown in FIG. 3A through 3C, the process 300 is performed three times in a mini-batch associated with an image-text pair 310, which includes an image (x) 305 and a corresponding text (w) 308. In the first iteration shown in FIG. 3A, the process 300 is performed using the image x 305 and the text w 308, where {x, w} is a paired image-text pair 310 (also referred to as a positive pair). In the second iteration shown in FIG. 3B, the text w 308 is replaced with another text w', and the process 300 is performed using the image x 305 and the text w' 308. In the third iteration shown in FIG. 3C, the image x 305 is replaced with another image x', and the process 300 is performed using the image x' 305 and the text w 308. In the second and third iterations, the pairs {x, w'} and {x', w} are unpaired image-text pairs 310 (also referred to as negative pairs).

Turning to the first iteration shown in FIG. 3A, the electronic device 101 obtains the image-text pair 310 that includes the image x 305 and the corresponding text w 308. For example, the image 305 may show a dog lying on a sofa, and the text 308 can be the text string "A dog is lying on a sofa." Due to the correspondence between the two, the image 305 and the text 308 can have one or more object tags in common (such as "dog" and "sofa" in this example) and thus are considered to be a paired image-text pair. The image-text pair 310 is part of a batch of training data (also referred to as a training dataset) $\mathcal{D}$ of size N which can be denoted as $\mathcal{D} = \{(x_i, w_i)\}_{i=1}^{N}$. Here, $x_i$ represents the set of images 305 in the batch of training data, and $w_i$ represents the corresponding set of texts 308 in the batch of training data.

The electronic device 101 inputs the image 305 to a convolutional object detector 315. The object detector 315 detects one or more objects or regions within the image 305 (such as a dog, a sofa, a table, and the like) and represents each visual feature of the object or region as a feature vector (v) 325. The object detector 315 represents any suitable process, technique, or algorithm for generating feature vectors from an image. In this case, the visual feature vectors 325 can be represented as $v_i$, $i=\{0 \ldots K-1\}$, where $v_i \in \mathcal{R}^d$, K represents the number of detected features, and d represents the dimension of the feature vectors 325.

The electronic device 101 also inputs the text 308 to a word embedding model 320. The word embedding model 320 analyzes each word in the text 308 (such as "dog," "lying," "sofa," and the like) and represents each word as a word embedding (q) 330. The word embedding model 320 represents any suitable process, technique, or algorithm for generating word embeddings from a text. In this case, the word embeddings 330 can be represented as $q_i$, $i=\{0 \ldots N-1\}$, where N represents the number of words in the text 308.

The electronic device 101 provides the feature vectors 325 and the word embeddings 330 as inputs to a multi-modal transformer network 340. The transformer network 340 represents a deep learning or neural network, such as a CNN, or a portion thereof. In some embodiments, the transformer network 340 can be implemented in conjunction with a downstream task, such as one of the one or more downstream tasks 225 of FIG. 2. An output of the transformer network 340 is a multi-modal representation vector (z) 350.

In general, multi-modal architectures for downstream tasks typically involve learning the multi-modal representation vector $z \in \mathcal{R}^d$, which can be represented as follows.

$$z = f(x, w) \tag{1}$$

In Equation (1), the function $f( )$ represents the multi-modal network (such as the transformer network 340), and x and w represent the image-text pair. With learned representations, a linear projection layer with a softmax function can be used for a downstream task 225 with a cross-entropy loss or bounding box prediction with object detection loss, such as a smooth L1 loss.

In the process 300, the transformer network 340 can expect visual representations from the detected bounding boxes in the images 305 and word representations from the text 308. In this case, the multi-modal representation vector (z) 350 can be represented as follows.

$$z = f(q, v|x, w; \theta_d, \theta_w) \tag{2}$$

Here, $\theta_d$ and $\theta_w$, represent the parameters of the object detector 315 and the word embedding model 320, respectively. Also, q and v represent the word embeddings 330 and the visual feature vectors 325, respectively.

Once the electronic device 101 determines the multi-modal representation vector 350, the electronic device 101 inputs the multi-modal representation vector 350 to a classifier 360, which outputs a predicted class label 370 for the paired image-text pair 310. The classifier 360 represents any suitable classification process, technique, or algorithm for classifying and predicting class labels for image-text pairs, such as a binary classifier. In the first iteration of the process 300 as shown in FIG. 3A, the contrastive learning objective for the paired image-text pair (x, w) 310 is represented as follows.

$$L_c(x, w) = -\mathbb{E}_{(x,w) \sim D} \log p(y = 0 | f_c(z; \theta_c | x, w; \theta_f)) \tag{3}$$

Here, $L_c(x, w)$ represents the contrastive learning objective, $\mathbb{E}$ represents an expectation function, y=0 represents the category label for a positive image-text pair, $\theta_c$ represents the parameters of the classifier 360, and $\theta_f$ represents the parameters of the transformer network 340.

Turning to FIG. 3B, the electronic device 101 performs the second iteration of the process 300. In the second iteration, the text w 308 is replaced with another text w'. For example, if the text w 308 is "A dog is lying on a sofa," the text w' could be "Summer is one of the four seasons" or any other suitable text. The text w' is paired with the image x 305 as an unpaired image-text pair 310, and the electronic device 101 performs the second iteration of the process 300. In the second iteration of the process 300 as shown in FIG. 3B, the transformer network 340 determines a multi-modal representation vector (z') 350, which can be represented as follows.

$$Z' = f(q', v|x, w'; \theta_d, \theta_w) \tag{4}$$

In the second iteration of the process 300 as shown in FIG. 3B, the contrastive learning objective for the unpaired image-text pair (x, w') 310 is represented as follows.

$$L_c(x, w') = -\mathbb{E}_{(x,w') \sim D} \log p(y = 1 | f_c(z; \theta_c | x, w'; \theta_f)) \tag{5}$$

Here, y=1 represents the category label for a negative image-text pair.

Turning to FIG. 3C, the image x 305 is replaced with another image x'. For example, if the image x shows a dog lying on a sofa, the image x' could show a river, a building, or any other suitable image. The image x' is paired with the text w 308 as an unpaired image-text pair 310, and the electronic device 101 performs the third iteration of the process 300. In the third iteration of the process 300 as shown in FIG. 3C, the transformer network 340 determines the multi-modal representation vector (z') 350, which can be represented as follows.

$$z' = f(q, v'|x', w; \theta_d, \theta_w) \tag{6}$$

In the third iteration of the process 300 as shown in FIG. 3C, the contrastive learning objective for the unpaired image-text pair (x', w) 310 is represented as follows.

$$L_c(x', w) = -\mathbb{E}_{(x',w) \sim D} \log p(y = 1 | f_c(z; \theta_c | x', w; \theta_f)) \tag{7}$$

Once the electronic device 101 has performed the three iterations of the process 300, the electronic device 101 determines a global level cross-modality contrastive learning loss, which can be determined as the optimization of the linear combination of the three losses of Equations (3), (5), and (7). This can be represented as follows.

$$\operatorname{argmax}_{\theta_f, \theta_c} L_g = L_c(x, w) + L_c(x, w') + L_c(x', w) \tag{8}$$

With the global level cross-modality contrastive learning loss $L_g$ of Equation (8), the goal is to train the transformer network 340 to align the representations of the positive image-text pairs (x, w) while pushing the representations of the negative image-text pairs (x', w) and (x, w') away from the representations of the positive image-text pairs (x, w). As illustrated above, particular embodiments use image-text pairs, rather than specific features of a feature vector, as input to the objective function(s) for supervised contrastive learning for multi-modal downstream tasks.

Although FIGS. 3A through 3C illustrate one example of a process 300 for supervised contrastive learning for multi-modal tasks, various changes may be made to FIGS. 3A through 3C. For example, while three iterations of the process 300 are shown here, any number of iterations involving the training data may be performed. Also, while the second iteration shown in FIG. 3B is described as being performed before the third iteration shown in FIG. 3C, the order of the iterations can vary as needed or desired. Further, while shown as a specific sequence of operations, various operations shown in FIGS. 3A through 3C could overlap, occur in parallel, occur in a different order, or occur any number of times (including zero times). In addition, the specific operations shown in FIGS. 3A through 3C are examples only, and other techniques could be used to perform each of the operations shown in FIGS. 3A through 3C.

Figure 4A:
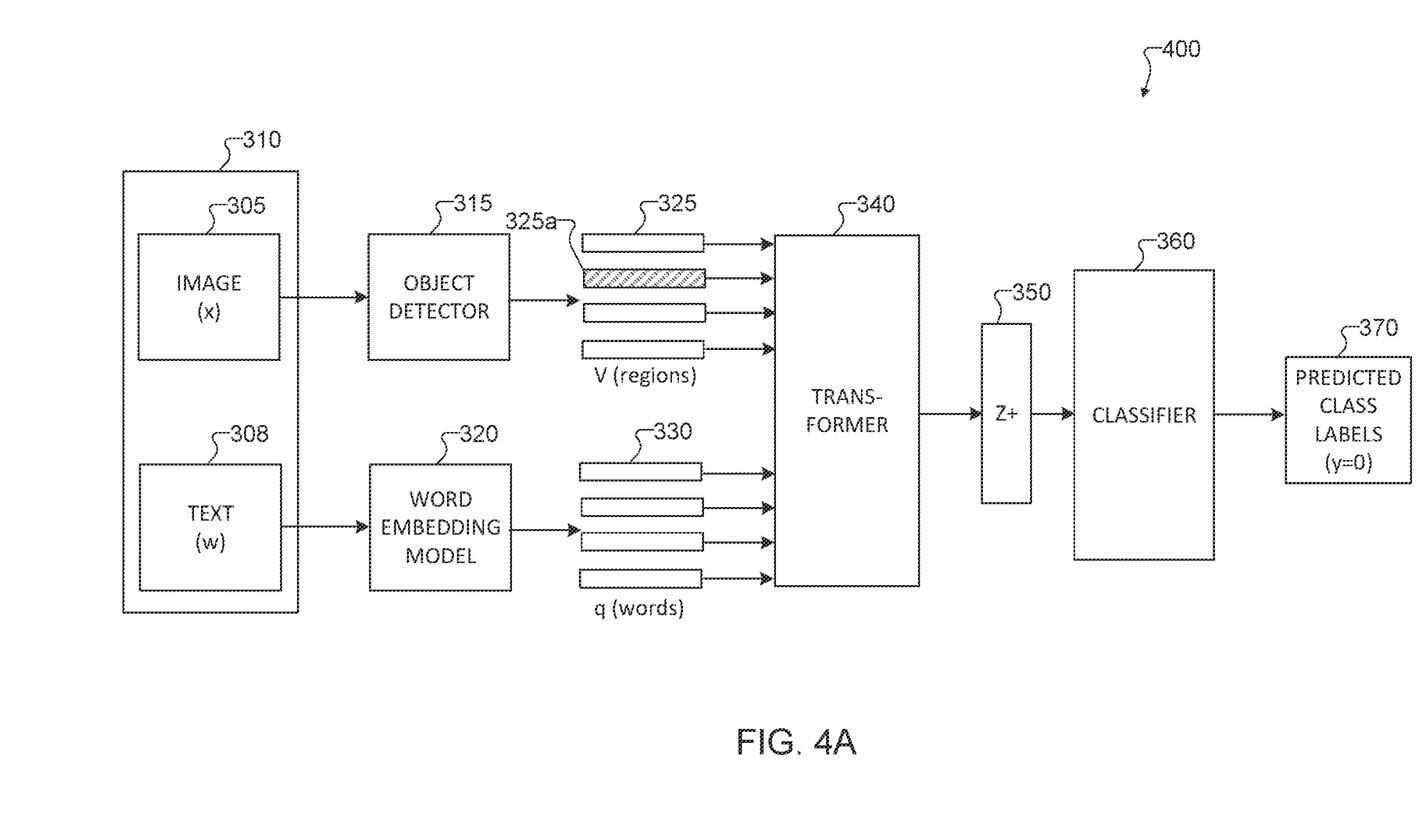
FIGS. 4A and 4B illustrate multiple iterations of an example process for supervised contrastive learning of regional visual features for multi-modal tasks according to this disclosure.
Figure 4B:
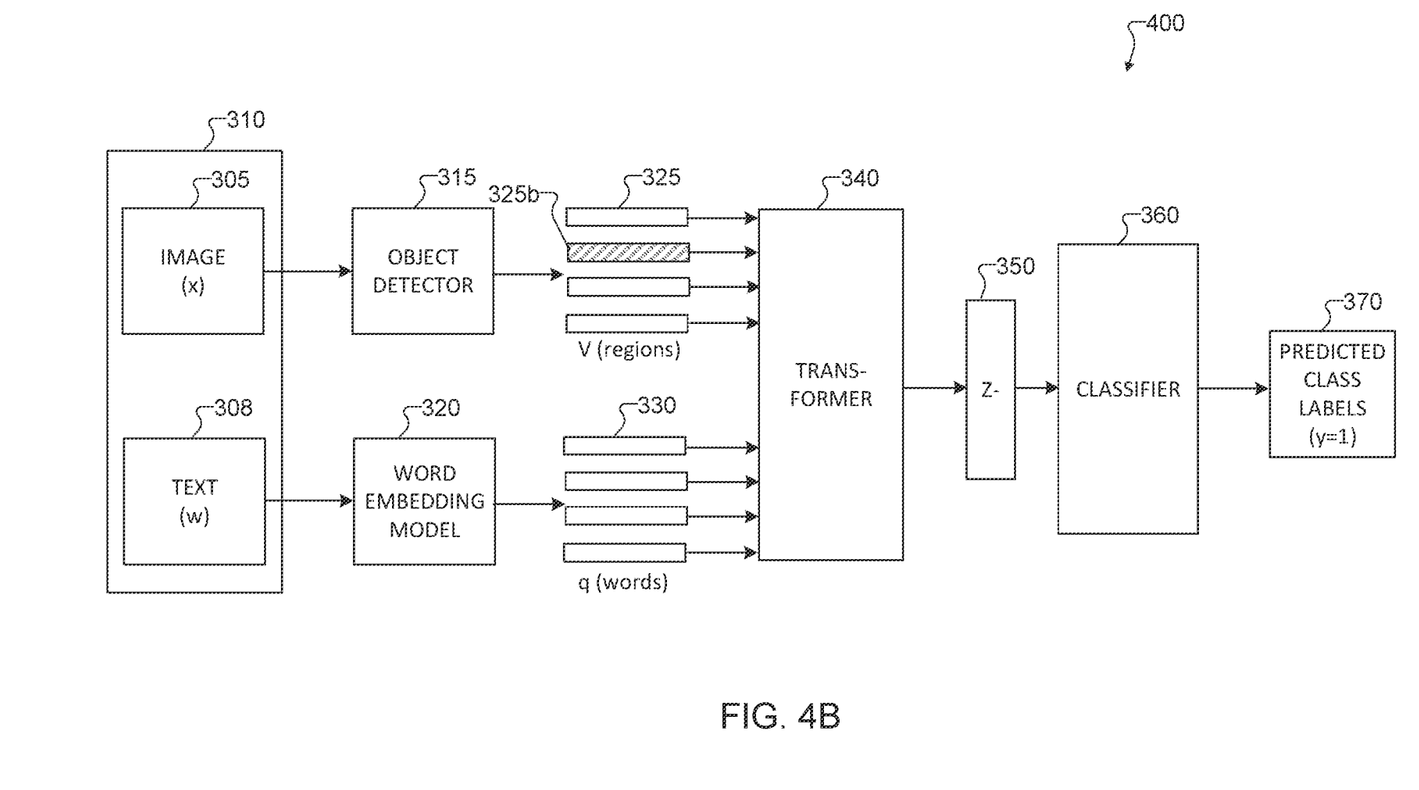

FIGS. 4A and 4B illustrate multiple iterations of an example process 400 for supervised contrastive learning of regional visual features for multi-modal tasks according to this disclosure. For ease of explanation, the process 400 is described as representing at least a portion of the supervised contrastive learning 230 of FIG. 2 and can be performed in conjunction with one or more fine-tuning tasks, such as the one or more fine-tuning tasks 220 of FIG. 2. Also, for ease of explanation, the process 400 is described as being performed using one or more components of the electronic device 101 described above. However, this is merely one example, and the process 400 could be performed using any other suitable device(s), such as the server 106. In addition, note that the process 400 includes a number of components and operations that are the same as or similar to corresponding components and operations of the process 300 of FIGS. 3A through 3C.

By using region-level contrastive loss techniques of the process 400, the electronic device 101 can learn multi-modal representations that align regional visual features of common object categories together while pushing apart regional visual features of different object categories given the text inputs for both cases. As shown in FIGS. 4A and 4B, the process 400 is performed twice in a mini-batch associated with an image-text pair 310 that includes an image (x) 305 and a corresponding text (w) 308. The first iteration of the process 400 is shown in FIG. 4A, and the second iteration of the process 400 is shown in FIG. 4B. In both iterations, the process 400 is performed using the image x 305 and the text w 308, where {x, w} is a paired image-text pair 310.

Instead of replacing the entire image or the entire text for the image (as described in FIGS. 3B and 3C above), a vector representation of a region of the image 305 in the process 400 is replaced with a vector representation of a different image region. Stated differently, given the visual feature vectors 325 represented as $v_i$, i={0 . . . K−1} and their corresponding object categories (or tags) $t_i$, i={0 . . . K−1}, the process 400 provides a contrastive learning objective to align region-level visual features with similar region tags in a mini-batch scenario.

Turning to the first iteration of the process 400 shown in FIG. 4A, the electronic device 101 obtains the image-text pair 310 that includes the image (x) 305 and the corresponding text (w) 308. For example, the image 305 may show a dog lying on a sofa, and the text 308 can be the text string "A dog is lying on a sofa." Thus, the image-text pair 310 is considered to be a paired image-text pair. The electronic device 101 inputs the image 305 to the convolutional object detector 315, which detects one or more objects or regions within the image 305 and represents each visual feature of the object or region as a feature vector (v) 325. The electronic device 101 inputs the text 308 to the word embedding model 320, which analyzes each word in the text 308 and represents each word as a word embedding (q) 330.

Before the electronic device 101 inputs the feature vectors 325 and the word embeddings 330 to the transformer network 340, the electronic device 101 replaces at least one of the feature vectors 325 with at least one similar (but not exactly the same) feature vector 325a. In some cases, the feature vector(s) 325 to be replaced can be selected at random. For example, if the image 305 shows a dog lying on a sofa, the feature vector 325 for the region of the image 305 showing the dog can be replaced with a feature vector 325a corresponding to an image of a different dog. The different dog represented by the feature vector 325a may be of a different size, different color, different breed, or the like but is still a dog (as opposed to another type of object). Therefore, the feature vector 325a has the same tag $t_i$ as the replaced feature vector 325. After the feature vector 325 is replaced with the feature vector 325a, the electronic device 101 inputs the feature vectors 325 and 325a and the word embeddings 330 to the transformer network 340. The transformer network 340 outputs a multi-modal representation vector ($z^+$) 350, which can be represented as follows:

$$z^+ = f(q, v^+ | X, w; \theta_d, \theta_W) \quad (9)$$

Here, $v^+$ represents the set of visual feature vectors 325 and 325a.

Once the electronic device 101 determines the multi-modal representation vector 350, the electronic device 101 inputs the multi-modal representation vector 350 to the classifier 360, which outputs a predicted class label 370 for the image-text pair 310. In the first iteration of the process 400 as shown in FIG. 4A, the contrastive learning objective for the image-text pair 310 is represented as follows.

$$L_{r^+} = -\mathbb{E}_{(x,w) \sim D} \log p(y=0 | f_c(z^+; \theta_c)) \quad (10)$$

Here, $L_{r^+}$ represents the contrastive learning objective, and y=0 represents the category label for a positive image-text pair.

Turning to FIG. 4B, the electronic device 101 performs the second iteration of the process 400. In the second iteration, the image x 305 and the text w 308 are used again, where {x, w} is a paired image-text pair 310. The electronic device 101 again inputs the image 305 to the convolutional object detector 315 (which generates the feature vectors 325) and inputs the text 308 to the word embedding model 320 (which generates the word embeddings 330). In the second iteration, the electronic device 101 replaces at least one of the feature vectors 325 with at least one different feature vector 325b that has a different tag $t_i$ than the replaced feature vector 325. For example, if the image 305 shows a dog lying on a sofa, the feature vector 325 for the region of the image 305 showing the dog can be replaced with a feature vector 325b corresponding to an image of a cat or another object that is not a dog. After the feature vector 325 is replaced with the feature vector 325b, the electronic device 101 inputs the feature vectors 325 and 325b and the word embeddings 330 to the transformer network 340. The transformer network 340 outputs a multi-modal representation vector ($z^-$) 350, which can be represented as follows.

$$z^- = f(q, v^- | x, w; \theta_d, \theta_w) \quad (11)$$

Here, $v^-$ represents the set of visual feature vectors 325 and 325b.

Once the electronic device 101 determines the multi-modal representation vector 350, the electronic device 101 inputs the multi-modal representation vector 350 to the classifier 360, which outputs a predicted class label 370 for the image-text pair 310. In the second iteration of the process 400 as shown in FIG. 4B, the contrastive learning objective for the image-text pair 310 is represented as follows.

$$L_{r^-} = -\mathbb{E}_{(x,w) \sim D} \log p(y=1 | f_c(z^-; \theta_c)) \quad (12)$$

Here, $L_{r^-}$ represents the contrastive learning objective, and y=1 represents the category label for a negative image-text pair.

Once the electronic device 101 has performed the two iterations of the process 400, the electronic device 101 can determine a regional-level cross-modality contrastive learning loss, which can be determined as the optimization of the linear combination of the two losses of Equations (10) and (12). This can be represented as follows.

$$L_r = L_{r^+} + L_{r^-}. \quad (13)$$

As explained above, particular embodiments focus on one or more specific objects or regions in the image and the corresponding feature vectors representing those objects or regions, not merely on replacing a portion of a feature vector representing an image without regard to whether that portion corresponds to a particular object or region in the image.

Although FIGS. 4A and 4B illustrate one example of a process 400 for supervised contrastive learning of regional visual features for multi-modal tasks, various changes may be made to FIGS. 4A and 4B. For example, while two iterations of the process 400 are shown here, any number of iterations involving the training data may be performed.

Also, while the process 400 is described as replacing one feature vector 325 in each iteration, other embodiments could include replacing more than one feature vector 325. Further, while shown as a specific sequence of operations, various operations shown in FIGS. 4A and 4B could overlap, occur in parallel, occur in a different order, or occur any number of times (including zero times). In addition, the specific operations shown in FIGS. 4A and 4B are examples only, and other techniques could be used to perform each of the operations shown in FIGS. 4A and 4B.

Note that the operations and functions shown in FIGS. 2 through 4B can be implemented in an electronic device 101, server 106, or other device in any suitable manner. For example, in some embodiments, the operations and functions shown in FIGS. 2 through 4B can be implemented or supported using one or more software applications or other software instructions that are executed by the processor 120 of the electronic device 101, server 106, or other device. In other embodiments, at least some of the operations and functions shown in FIGS. 2 through 4B can be implemented or supported using dedicated hardware components. In general, the operations and functions shown in FIGS. 2 through 4B can be performed using any suitable hardware or any suitable combination of hardware and software/firmware instructions.

Figure 5:
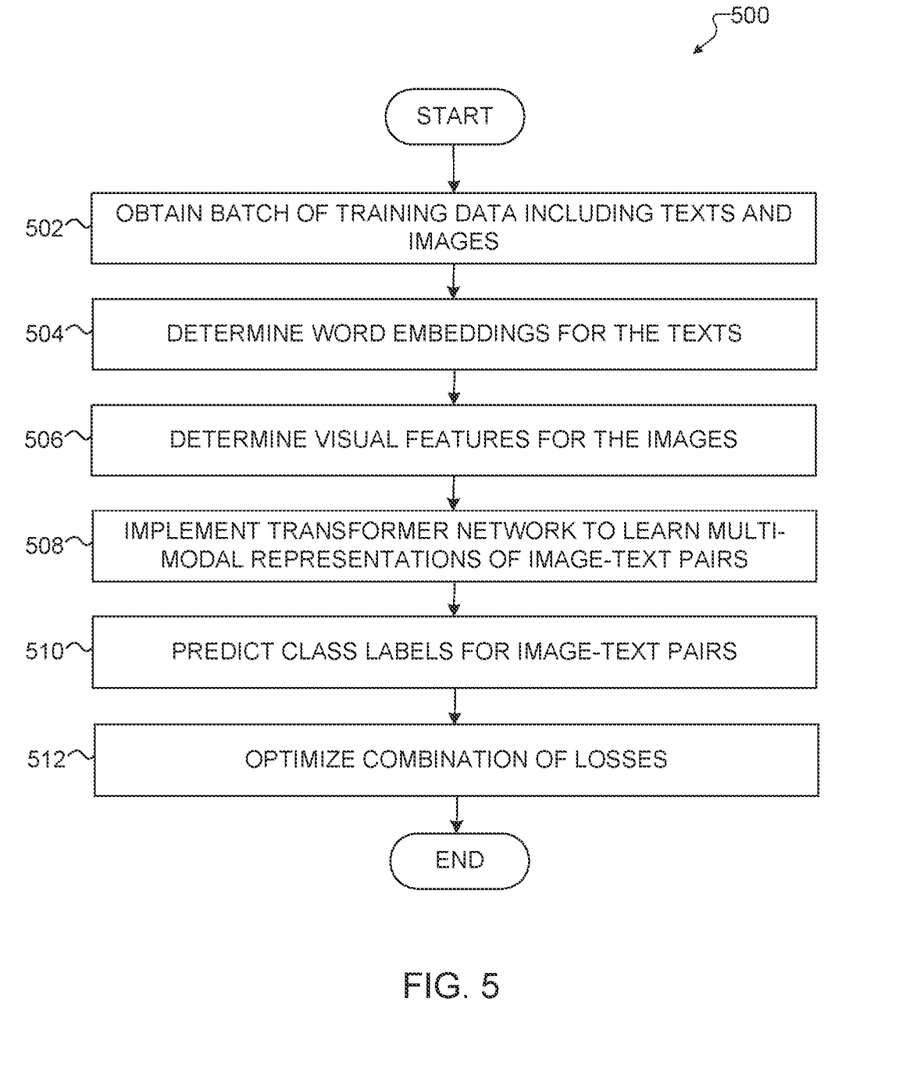
FIG. 5 illustrates an example method for supervised contrastive learning for multi-modal tasks according to this disclosure.

FIG. 5 illustrates an example method 500 for supervised contrastive learning for multi-modal tasks according to this disclosure. For ease of explanation, the method 500 shown in FIG. 5 is described as involving the use of the electronic device 101 shown in FIG. 1 and at least one of the processes 300 and 400 shown in FIGS. 3A through 4B. However, the method 500 shown in FIG. 5 could be used with any other suitable electronic device (such as the server 106) and any suitable process.

As shown in FIG. 5, a batch of training data that includes multiple paired image-text pairs and multiple unpaired image-text pairs is obtained at step 502. This could include, for example, the electronic device 101 obtaining multiple image-text pairs 310, including multiple images 305 and multiple texts 308. Each paired image-text pair and each unpaired image-text pair includes an image 305 and a text 308. Word embeddings for the texts of the paired image-text pairs and the unpaired image-text pairs are determined at step 504. This could include, for example, the electronic device 101 inputting the texts 308 to a word embedding model 320 and using the word embedding model 320 to determine the word embeddings 330. Visual features for the images of the paired image-text pairs and the unpaired image-text pairs are determined at step 506. This could include, for example, the electronic device 101 inputting the images 305 to the object detector 315 and using the object detector 315 to generate feature vectors 325.

A transformer network is implemented using the word embeddings and the visual features to learn multi-modal representations of the paired image-text pairs and the unpaired image-text pairs at step 508. This could include, for example, the electronic device 101 implementing the transformer network 340 to determine multi-modal representation vectors 350. The multi-modal representations of the image-text pairs are classified to predict class labels for the image-text pairs at step 510. This could include, for example, the electronic device 101 implementing the classifier 360 and outputting predicted class labels 370.

While the multi-modal representations of the image-text pairs are learned and classified, a combination of losses are optimized at step 512. This could include, for example, the electronic device 101 optimizing the losses in accordance with Equation (8) or (13) above. The losses include, for each paired image-text pair, a first multi-modal representation loss based on the paired image-text pair (such as $L_c(x, w)$), and a second multi-modal representation loss based on two or more unpaired image-text pairs corresponding to the paired image-text pair (such as $L_c(x, w')$ and $L_c(x', w)$).

The steps 502-512 can be performed in multiple iterations using paired and unpaired image-text pairs, such as is described above with respect to FIGS. 3A through 3C or FIGS. 4A and 4B. Thus, the steps 502-512 in FIG. 5 may be repeated during different iterations, such as two or three iterations per paired image-text pair.

Although FIG. 5 illustrates one example of a method 500 for supervised contrastive learning for multi-modal tasks, various changes may be made to FIG. 5. For example, while shown as a series of steps, various steps in FIG. 5 could overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
   obtaining a batch of training data including multiple paired image-text pairs and multiple unpaired image-text pairs, wherein each paired image-text pair and each unpaired image-text pair comprises an image and a text; and
   training a machine learning model using the training data based on an optimization of a combination of losses, wherein the losses include, for each paired image-text pair:
   a first multi-modal representation loss based on the paired image-text pair; and
   a second multi-modal representation loss based on two or more unpaired image-text pairs, selected from among the multiple unpaired image-text pairs, wherein the two or more unpaired image-text pairs comprise (i) a first unpaired image-text pair in which the text of the paired image-text pair is replaced with another text and (ii) a second unpaired image-text pair in which the image of the paired image-text pair is replaced with another image.

2. The method of claim 1, further comprising:
   for each paired image-text pair, determining the second multi-modal representation loss by calculating a first loss associated with the first unpaired image-text pair and a second loss associated with the second unpaired image-text pair.

3. The method of claim 1, wherein the losses further include, for each paired image-text pair:
   a third multi-modal representation loss based on the paired image-text pair in which a representation of a first object in the image of the paired image-text pair is replaced with a representation of a second object that is of a same type as the first object; and
   a fourth multi-modal representation loss based on the paired image-text pair in which a representation of the first object in the image of the paired image-text pair is replaced with a representation of a third object that is of a different type than the first object.

4. The method of claim 1, wherein, in each paired image-text pair, at least one tag of the image matches at least one tag of the text.

5. The method of claim 1, wherein the machine learning model is trained in association with a downstream task comprising at least one of: visual question answering (VQA), graph question answering (GQA), referring expressions, caption generation, and image retrieval.

6. The method of claim 1, wherein the first multi-modal representation loss comprises a cross-entropy loss or an object detection loss.

7. A method comprising:
obtaining a batch of training data including multiple paired image-text pairs and multiple unpaired image-text pairs, wherein each paired image-text pair and each unpaired image-text pair comprises an image and a text; and
training a machine learning model using the training data based on an optimization of a combination of losses, wherein the losses include, for each paired image-text pair:
a first multi-modal representation loss based on the paired image-text pair; and
a second multi-modal representation loss based on two or more unpaired image-text pairs, selected from among the multiple unpaired image-text pairs, wherein each of the two or more unpaired image-text pairs includes either the image or the text of the paired image-text pair;
wherein training the machine learning model comprises:
determining word embeddings for the texts of the paired image-text pairs and the unpaired image-text pairs;
determining visual features for the images of the paired image-text pairs and the unpaired image-text pairs; and
implementing a transformer network using the word embeddings and the visual features to learn multi-modal representations of the paired image-text pairs and the unpaired image-text pairs.

8. An electronic device comprising:
at least one memory configured to store instructions; and
at least one processing device configured when executing the instructions to:
obtain a batch of training data including multiple paired image-text pairs and multiple unpaired image-text pairs, wherein each paired image-text pair and each unpaired image-text pair comprises an image and a text; and
train a machine learning model using the training data based on an optimization of a combination of losses, wherein the losses include, for each paired image-text pair:
a first multi-modal representation loss based on the paired image-text pair; and
a second multi-modal representation loss based on two or more unpaired image-text pairs, selected from among the multiple unpaired image-text pairs, wherein each of the two or more unpaired image-text pairs comprise (i) a first unpaired image-text pair in which the text of the paired image-text pair is replaced with another text and (ii) a second unpaired image-text pair in which the image of the paired image-text pair is replaced with another image.

9. The electronic device of claim 8, wherein the at least one processing device is further configured when executing the instructions to:
for each paired image-text pair, determine the second multi-modal representation loss by calculating a first loss associated with the first unpaired image-text pair and a second loss associated with the second unpaired image-text pair.

10. The electronic device of claim 8, wherein the losses further include, for each paired image-text pair:
a third multi-modal representation loss based on the paired image-text pair in which a representation of a first object in the image of the paired image-text pair is replaced with a representation of a second object that is of a same type as the first object; and
a fourth multi-modal representation loss based on the paired image-text pair in which a representation of the first object in the image of the paired image-text pair is replaced with a representation of a third object that is of a different type than the first object.

11. The electronic device of claim 8, wherein, in each paired image-text pair, at least one tag of the image matches at least one tag of the text.

12. The electronic device of claim 8, wherein, to train the machine learning model, the at least one processing device is configured when executing the instructions to:
determine word embeddings for the texts of the paired image-text pairs and the unpaired image-text pairs;
determine visual features for the images of the paired image-text pairs and the unpaired image-text pairs; and
implement a transformer network using the word embeddings and the visual features to learn multi-modal representations of the paired image-text pairs and the unpaired image-text pairs.

13. The electronic device of claim 8, wherein the at least one processing device is configured when executing the instructions to train the machine learning model in association with a downstream task comprising at least one of: visual question answering (VQA), graph question answering (GQA), referring expressions, caption generation, and image retrieval.

14. The electronic device of claim 8, wherein the first multi-modal representation loss comprises a cross-entropy loss or an object detection loss.

15. A non-transitory machine-readable medium containing instructions that when executed cause at least one processor of an electronic device to:
obtain a batch of training data including multiple paired image-text pairs and multiple unpaired image-text pairs, wherein each paired image-text pair and each unpaired image-text pair comprises an image and a text; and
train a machine learning model using the training data based on an optimization of a combination of losses, wherein the losses include, for each paired image-text pair:
a first multi-modal representation loss based on the paired image-text pair; and
a second multi-modal representation loss based on two or more unpaired image-text pairs, selected from among the multiple unpaired image-text pairs, wherein the two or more unpaired image-text pairs comprise (i) a first unpaired image-text pair in which the text of the paired image-text pair is replaced with another text and (ii) a second unpaired image-text pair in which the image of the paired image-text pair is replaced with another image.

16. The non-transitory machine-readable medium of claim 15, further containing instructions that when executed cause the at least one processor to:
for each paired image-text pair, determine the second multi-modal representation loss by calculating a first loss associated with the first unpaired image-text pair and a second loss associated with the second unpaired image-text pair.

17. The non-transitory machine-readable medium of claim 15, wherein the losses further include, for each paired image-text pair:
- a third multi-modal representation loss based on the paired image-text pair in which a representation of a first object in the image of the paired image-text pair is replaced with a representation of a second object that is of a same type as the first object; and
- a fourth multi-modal representation loss based on the paired image-text pair in which a representation of the first object in the image of the paired image-text pair is replaced with a representation of a third object that is of a different type than the first object.

18. The non-transitory machine-readable medium of claim 15, wherein, in each paired image-text pair, at least one tag of the image matches at least one tag of the text.

19. The non-transitory machine-readable medium of claim 15, wherein the instructions that when executed cause the at least one processor to train the machine learning model comprise instructions that when executed cause the at least one processor to:
- determine word embeddings for the texts of the paired image-text pairs and the unpaired image-text pairs;
- determine visual features for the images of the paired image-text pairs and the unpaired image-text pairs; and
- implement a transformer network using the word embeddings and the visual features to learn multi-modal representations of the paired image-text pairs and the unpaired image-text pairs.

20. The non-transitory machine-readable medium of claim 15, wherein the first multi-modal representation loss comprises a cross-entropy loss or an object detection loss.

\* \* \* \* \*